United States Patent [19]

Hoffman et al.

[11] 4,349,817
[45] Sep. 14, 1982

[54] LIQUID CRYSTAL DISPLAY SYSTEM USING FIBER OPTIC FACEPLATES

[76] Inventors: William C. Hoffman, 23217 Wade Ave., Torrance, Calif. 90505; John E. Gunther, 21217 S. Harvard, Torrance, Calif. 90501; William R. Lichty, 6001 Canterbury Dr., Culver City, Calif. 90230

[21] Appl. No.: 116,364

[22] Filed: Jan. 28, 1980

[51] Int. Cl.³ .............................................. G09G 3/36
[52] U.S. Cl. ............................... 340/784; 340/815.31; 350/332; 350/345
[58] Field of Search ............... 340/784, 380, 705, 700; 350/96.31, 332, 96.3, 333, 331, 330, 345

[56] References Cited

U.S. PATENT DOCUMENTS

| | | | |
|---|---|---|---|
| 3,744,878 | 7/1973 | Kiemle et al. | 340/784 |
| 3,750,136 | 7/1973 | Roess | 340/784 |
| 3,853,384 | 12/1974 | Pinnow et al. | 350/96.31 |
| 3,899,786 | 8/1975 | Greubel et al. | 340/784 |
| 3,967,265 | 6/1976 | Jacob | 340/784 |
| 4,019,607 | 4/1977 | Mandel et al. | 340/380 |
| 4,039,803 | 8/1977 | Harsch | 350/332 |
| 4,088,992 | 5/1978 | Kmetz | 340/380 |
| 4,095,217 | 6/1978 | Tani et al. | 350/332 |
| 4,185,890 | 1/1980 | Onoda et al. | 350/96.31 |
| 4,257,041 | 3/1981 | Masucci | 340/705 |

Primary Examiner—Marshall M. Curtis
Attorney, Agent, or Firm—Joseph E. Szabo; W. H. MacAllister

[57] ABSTRACT

In a liquid crystal image display system, a fiber optic faceplate which transmits light only through a well defined acceptance cone is optically coupled to the liquid crystal display surface of a reflective dynamic scattering mode liquid crystal display device.

In an image projector embodiment, light from an external light source is directed through the faceplate onto the liquid crystal display surface. Light scattered by activated (on-state) regions of the liquid crystal is substantially absorbed by the faceplate while light reflected from the non-activated (off-state) regions of the display surface is transmitted back through the faceplate to a projection lens which forms an image on a viewing screen.

In a second embodiment of the invention, a viewer directly observes the liquid crystal display surface under ambient light from either natural or artificial light sources. By absorbing light from unwanted sources outside its transmission acceptance cone, the faceplate prevents loss of image contrast while transmitting light from sources within its acceptance cone needed to illuminate the display.

13 Claims, 3 Drawing Figures

LIQUID CRYSTAL DISPLAY SYSTEM USING FIBER OPTIC FACEPLATES

TECHNICAL FIELD

This invention relates generally to liquid crystal display systems and particularly to such systems having a fiber optic faceplate.

BACKGROUND OF THE INVENTION

Liquid crystal image display systems have been increasingly used for display of graphic, symbolic, and TV pictorial images. Among the advantages of such display devices are high brightness, large scale display capability, compact size, and high resolution. The basic components of a liquid crystal light valve display system include a liquid crystal layer sandwiched between a transparent front electrode and a reflective back electrode. In the off-state, that is with no voltage applied across the electrodes, the liquid crystal is water clear. Light directed through the transparent electrode transmits through the liquid crystal layer, is reflected from the reflective electrode, and exits the transparent window with the result that a viewer sees a bright region on the liquid crystal display. Conversely, in the on-state, that is with a voltage applied across the electrodes, current flowing through the liquid crystal layer creates a turbulence that causes the liquid crystal to appear milky white. The milky white region scatters light away from the viewer who therefore perceives the region as dark or gray. Because the scattering increases with applied voltage, the shade of gray darkens with increasing voltage. This mode of modulation of the transmissivity of liquid crystal material in response to an applied voltage is called the "dynamic scattering mode".

In practical applications, a spatially modulated electric field pattern containing the image information to be displayed is impressed upon the liquid crystal by one of several methods. In one method, a matrix is individually addressable minute electrodes, each electrode forming one picture element, is formed on the back plate of the liquid crystal light valve. Such an approach is described in U.S. Pat. No. 3,824,003 issued to N. J. Koda et al on July 16, 1974; U.S. Pat. No. 3,862,360 issued to H. G. Dill et al on Jan. 21, 1975 and D. J. McGreivy on July 25, 1978. For the sake of completeness, these three patents are incorporated by reference herein.

In another method, the image containing electric field pattern is generated from an input image directed onto a photo-conductive layer located on the back side of the liquid crystal light valve. Such devices are disclosed in U.S. Pat. No. 3,824,002 issued to T. D. Beard on July 16, 1974 and U.S. Pat. No. 3,976,361 issued to L. M. Fraas et al on Aug. 24, 1976, these patents being incorporated by reference herein.

Two ways to use a liquid crystal light valve in display systems are as a projection system in which the liquid crystal layer of the light valve is projected by a projection lens onto a display screen, and as a direct view display in which the viewer observes the liquid crystal layer directly. In a liquid crystal projection display system described in U.S. Patent application Ser. No. 903,348 filed on May 5, 1978 by Lichty et al to issue as a U.S. Patent to the assignee of the present invention, an aspheric concave reflector is used to concentrate light from a light source onto a liquid crystal light valve where it is reflected through an optical aperture in the reflector to a lens which projects an image onto a viewing screen. Although the system provides a high brightness, high contrast image within a small size package, the aspherical mirror can be both difficult and costly to fabricate because of its unconventional surface shape.

An inherent problem encountered when a reflective dynamic scattering mode liquid crystal device is used as a direct view image display is that the contrast of the image is objectionably reduced by excessive levels of incident light from unwanted sources positioned outside the viewing field. Here, contrast is defined as the brightness ratio of the on-state to the off-state. These unwanted sources can be either the periphery of an extended source such as illuminated walls or sky or a discrete source of extraordinary brightness such as the sun. Heretofore, this problem has been solved by a shielding configuration in which the display is tilted to the viewers line of sight so that all specular reflections from the off-state liquid crystal must originate from a pre-selected area. That area is then blocked with a dark shield. An example of such a configuration is disclosed in the direct view image display device of U.S. Pat. No. 4,090,219 issued to M. N. Ernstoff on May 16, 1978. In an arrangement described in FIG. 1 of that patent, a light trap comprising a planar member having a light absorbing surface extends outwardly from the liquid crystal display surface. The display surface is tilted to the viewer's line of sight so that when the liquid crystal is in the transparent off-state, the viewer sees the dark light trap surface reflected from the back plate of the liquid crystal device with the result that the light valve appears black. When the cell is in the scattering on-state, ambient illumination is scattered from it toward the observer and the activated portion of the surface appears white. Unlike the projector device described previously in which the off-state and on-state are bright and dark, respectively, in this device the contrast is reversed because the off-state and on-state are dark and bright, respectively.

Although this display arrangement maintains a high contrast image even under illumination from highly intense or extended sources, the arrangement has several disadvantages, one of them being that the tilt of the liquid crystal display surface causes objectionable foreshortening of the image displayed on the liquid crystal layer. Another disadvantage is the difficulty in designing a light trap geometry which admits the ambient light needed to illuminate the display while providing an acceptably large angular viewing range and still maintain a small device.

SUMMARY OF THE INVENTION

Accordingly, it is an object of the present invention to provide means for improving the performance of image display arrangements using a reflective liquid crystal device operating in the dynamic scattering mode.

Another object of the present invention is to provide a reflective dynamic scattering liquid crystal image projection system which uses inexpensive, easily fabricated optical components.

A further object of the present invention is to provide a direct view image display system which blocks stray light from entering outside a well defined illumination angle to thereby maintain a high contrast image.

A still further object of the invention is to provide a direct view image display system which is compact.

Yet another object is to provide a liquid crystal display system which can be viewed perpendicularly to the liquid crystal display surface, thereby decreasing geometric distortion present in the prior art devices of this type.

These and other objects and advantages are achieved in an image display system comprising a reflective, dynamic scattering mode liquid crystal light valve having a liquid crystal display surface optically coupled to a fiber optic faceplate. The faceplate transmits light incident within a well-defined predetermined acceptance cone and absorbs light outside of the acceptance cone.

In an image projector embodiment, light from an external light source is directed through the faceplate onto the liquid crystal display surface. Light scattered from activated (on-state) regions of the liquid crystal is substantially absorbed by the faceplate while light specularly reflected from the non-activated (off-state) regions of the display surface is transmitted back through the faceplate to a projection lens which forms a high contrast image on a viewing screen.

In a direct view display system incorporating a second embodiment of the invention, a viewer directly observes the liquid crystal display surface under ambient light from either natural or artificial light sources. The faceplate transmits display illumination from sources within its acceptance cone while preventing loss of image contrast by absorbing light from unwanted sources outside its acceptance cone.

BRIEF DESCRIPTION OF THE DRAWINGS

These and other objects, features, and advantages will be more fully apparent in the following detailed description taken in conjunction with the accompanying drawings, wherein like numbers refer to like parts throughout and in which.

DETAILED DESCRIPTION OF THE DRAWINGS

Figure 1:
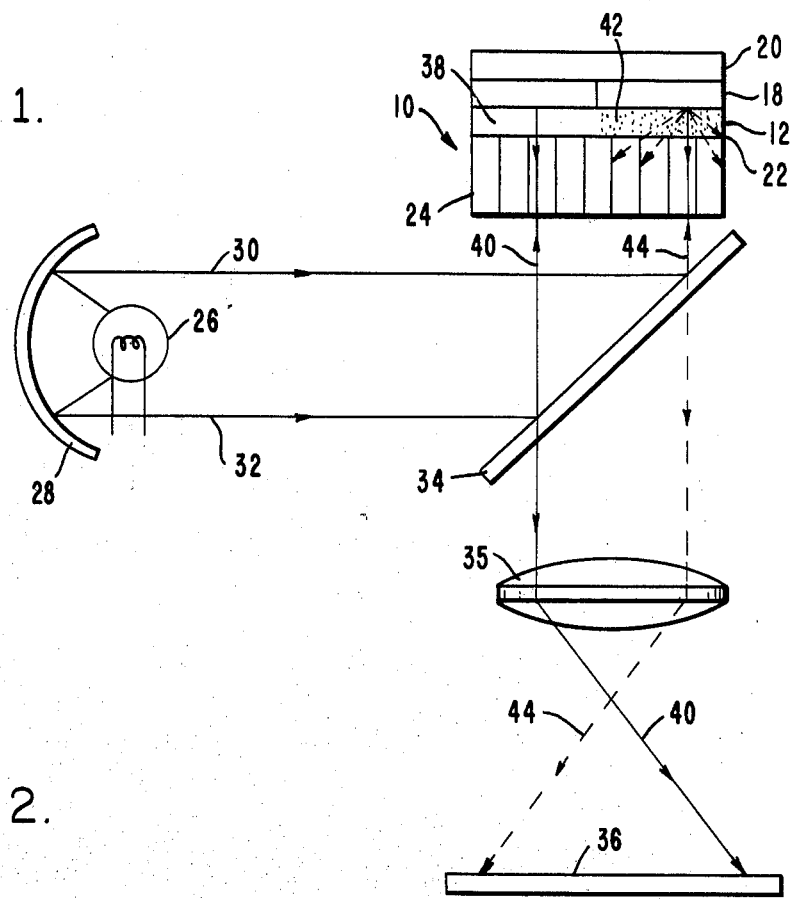
FIG. 1 is a schematic cross-sectional view of a liquid crystal image projector system in accordance with one embodiment of the invention.

Referring now in greater detail to FIG. 1, there is shown a schematic of a liquid crystal image projection system. The liquid crystal device 10 operating in the dynamic scattering mode is formed by sandwiching a layer of liquid crystal material 12 between a fiber optic faceplate 14 and a reflective electrode 18 mounted upon back plate 20. The inner surface of faceplate 14 has a transparent electrode 22. As pointed out earlier, the liquid crystal layer 12 is transparent when no electric field is present, but scatters light when an electric field is applied. If the electric field is driven by electronic signals, then the back plate 20 includes a matrix array of reflective electrodes as described earlier. However, if the device is to be driven by an input image, then back plate 20 includes a photoconductor of the type shown in the Beard or Fraas patents described above. With either of these drive arrangements, the image desired for display is transformed into an electric field pattern across the liquid crystal layer. Light from a high intensity light source 26, such as a xenon arc lamp, which is incident upon a reflector 28 is formed into a parallel beam defined by rays 30 and 32. This beam is directed to a beam splitter 34 and reflected from there onto faceplate 24.

Figure 2:
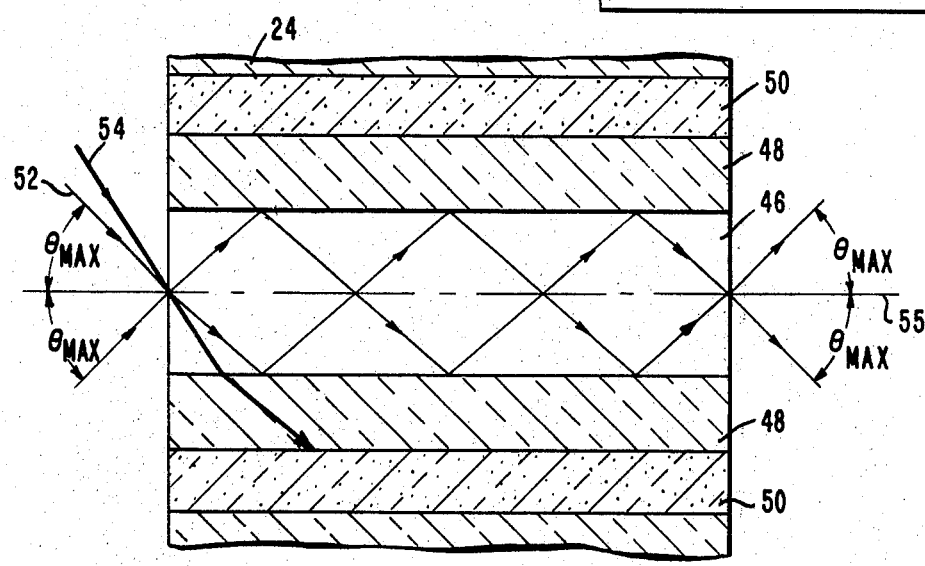
FIG. 2 is a detail of a particular type of fiber optic face plate used in the embodiments shown in FIG. 1 and FIG. 3.

Before continuing with FIG. 1, we refer now to FIG. 2, illustrating in greater detail one type of fiber optic faceplate 24 suitable with the system of FIG. 1. The faceplate is formed by a multiplicity of parallel optical fibers fused to one another. Each fiber comprises a transparent core 46 covered with a transparent sheath 48 having an index of refraction less than the index of refraction of core 46 and an optically absorbing material 50 which can form either a layer on sheath 48 or an interstitial filler between adjacent fibers formed by core 46 and sheath 48. Light, such as ray 52, incident within the angle $\theta_{max}$ to the fiber axis 55, propagates through the core 46 by means of multiple total internal reflections from the boundary of the core 46 and transparent sheath 48. On the other hand, a ray such as 54 incident on the fiber outside of $\theta_{max}$ will not be totally reflected, but will propagate through the sheath 46 and be absorbed in the light absorbing layer 50.

The faceplate thus has an acceptance cone of angle $\theta_{max}$ which is related to the indices of refraction of the core and the sheath, $n_1$, $n_2$, respectively, by the customary relationship $$\sin \theta_{max} = (n_1^2 - n_2^2)^{\frac{1}{2}} = N.A.$$

where N.A. is defined as the numerical aperture of the fiber.

Suitable all-glass fiber optic faceplate material having a wide range of cone angles (numerical apertures) is available as a standard product known as fused fiber faceplate containing ExtraMural Absorbtion (EMA), where EMA refers to the light absorbing material 50. Vendors of the product include Gallileo Electro-Optics, Sturbridge, Massachusetts; American Optical Company, Sturbridge, Massachusetts; and Collimated Holes, Inc., Cambell, California. As manufactured, the faceplate can have a more complex structure than described with reference to FIG. 2, but all have an array of fibers comprising a light transmitting core 46 and a light absorbing material which in combination provide a well defined acceptance cone of a specified angle $\theta_{max}$. The faceplate 24 is formed from a block of the EMA material into a plate having faces perpendicular to the optical fiber axes by cutting and polishing using conventional optical fabrication techniques.

Referring again to FIG. 1, light source 26, reflector 28, and beam splitter 34 are properly positioned so that the light is directed within the acceptance cone of face plate 24, that is, substantially perpendicular to the surfaces of faceplate 24. Thus, the light transmits through the fibers and onto the liquid crystal layer 12. Where no electric field is applied, the liquid crystal layer is transparent, such as in area 38. There the light is reflected from reflective electrode 18 back through face plate 24, as indicated by ray 40, and through beam splitter 34 and is then imaged by projection lens 35 onto viewing screen 36 with the result that the imaged region appears bright. Conversely, in areas where a voltage is applied across the liquid crystal layer, such as area 42, the incident light is scattered by the liquid crystal into a scattering angle substantially larger than the acceptance cone of the faceplate. Most of the scattered light, being outside of this acceptance cone, is thus absorbed within the faceplate. The small, unabsorbed portion of scattered light, shown as ray 44, is transmitted through face plate 24 to reach projection screen 36. The on-state region thus appears dark because only a small portion of the scattered light reaches screen 36. By increasing the applied voltage and hence the light scattering, the liquid display surface 12 can display shades of gray which vary from bright to dark. The screen 36 on which the liquid crystal image is projected can be of a conventional type such as used in film projectors, depending on the desired application, the screen can be made for viewing from either the front or rear.

The novel configuration of the invention of FIG. 1 provides a high contrast image in a compact assembly that can be manufactured at relatively low cost in comparison with prior art devices requiring a complex mirror shape. Furthermore, unlike prior art liquid crystal projection systems, the present invention contains no difficult-to-align apertures or reflective surfaces. Rather, a high contrast image is provided by a readily available fiber optic faceplate integral with the liquid crystal light valve to form a compact, easily alignable system.

Figure 3:
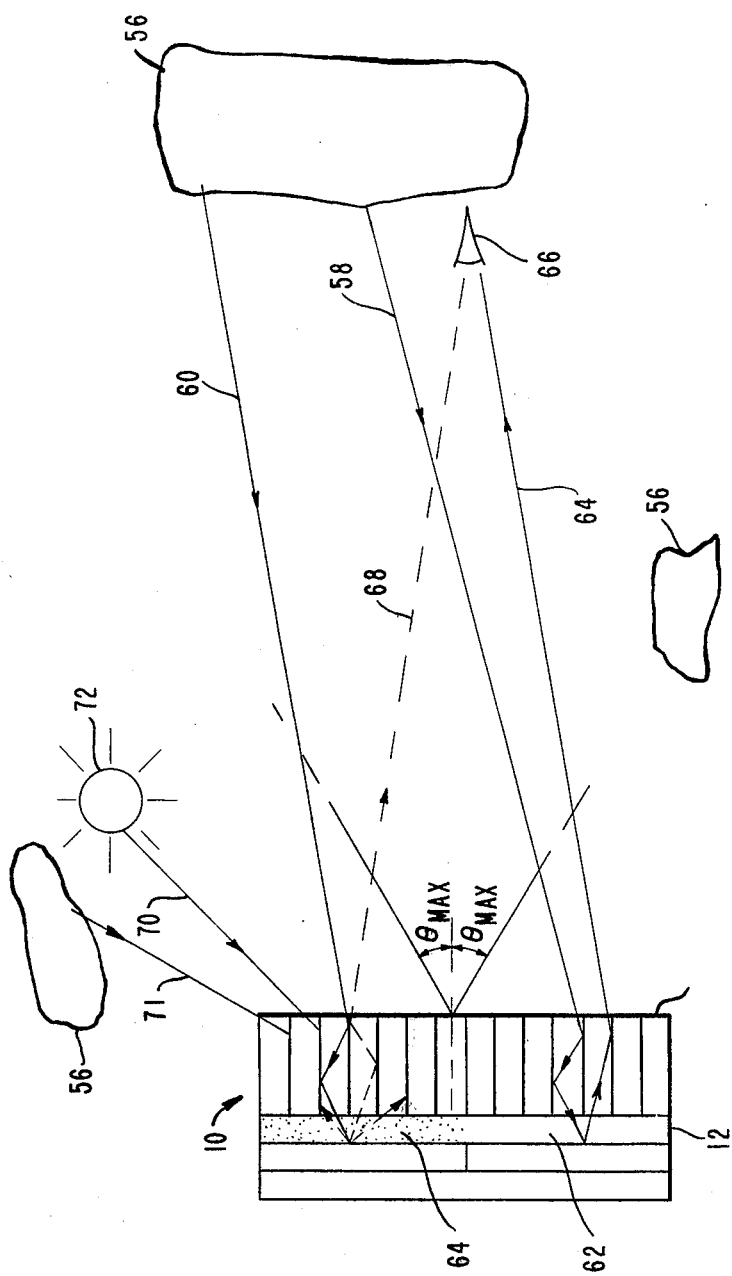
FIG. 3 is a schematic cross-sectional view of a direct view liquid crystal image display system in accordance with another embodiment of the invention.

Referring to FIG. 3, there is shown a schematic cross-sectional view of a direct view liquid crystal image display system as another embodiment of the invention.

Unlike the projection system of FIG. 1, the display of FIG. 3 is viewed directly under ambient light from an extended light source 56 such as, for example, bright sky, illuminated room walls, or other natural or artificial light sources. Light rays, such as rays 58 and 60, leaving source 56 impinge upon faceplate 24 within the acceptance cone angle $\theta_{max}$ of faceplate 24 and are thereby transmitted to liquid crystal layer 12. In particular, light ray 58 incident upon a liquid crystal area 62 in the off-state is specularly reflected along ray path 64 to the observer 66 who thus sees a relatively bright display region. Now considering light ray 60 incident upon a liquid crystal area 64 in the on-state, only some of the scattered light is directed along ray path 68 to the viewer 66 who therefore sees a relatively dark display region. Thus, as in the case of the projection system of FIG. 1, a viewer observes an image on the liquid crystal layer 12 formed by bright, reflecting areas in the off-state and dark, scattering areas in the on-state.

As described earlier, it is the prior art system comprising a liquid crystal device without the faceplate that is characterized by the inherent limitation of contrast loss. To better understand the invention it will be helpful to now discuss the manner in which the contrast loss occurs in the absence of the faceplate. Some portions of extended light source 56 and a discrete bright source 72 are unavoidably positioned so as to be reflected away from the observer by the transmitting on-state regions of the liquid crystal. On the other hand, light from these sources increases the brightness of the otherwise dark, scattering off-state regions with a resulting loss in contrast. In the case of such a source which is highly extended or very bright, the contrast can drop to zero. In the extreme case, as often occurs, the contrast can even be reversed so that the scattering regions actually appear brighter than the non-scattering regions. This problem is solved by the unique configuration of the device of FIG. 3, in which light enters and leaves the faceplate only within a well defined faceplate acceptance cone. Thus, by absorbing light from sources outside the acceptance cone, such as ray 70 from a bright discrete source 72 and ray 71 from the periphery of extended source 56, the faceplate prevents loss of the image contrast. In practice it has been determined that this advantageous effect occurs when the acceptance cone is smaller than the on-state scattering cone of the liquid crystal display surface.

Because viewing is perpendicular to the display, the geometric foreshortening present in the prior art direct view displays using planar light traps described earlier is avoided. Moreover, the compactness of the device makes it suitable for use in cramped areas such as aircraft cockpits and automobile dashboards.

In an exemplary system using a matrix-type liquid crystal display device, faceplate 24 was made from EMA material having a numerical aperture of 0.35 corresponding to a cone angle $\theta_{max}$ of 20°, a thickness of 0.3 inches, and a spacing between fiber centers of 40 micrometers. A usefully high image contrast was perceived under illumination from an extended source consisting of a room illuminated on all sides. The same beneficial effect was also observed when the display was illuminated by a bright incandescent light bulb placed just outside the acceptance cone of the faceplate. By comparison, a similar liquid crystal device not incorporating the faceplate was viewed under the same illumination conditions and produced unacceptably low contrast. Because of the advantageously small fiber spacing, display resolution is limited by the liquid crystal rather than the faceplate.

What is claimed is:

1. In an image projection system wherein a light source illuminates the display surface of a reflective liquid crystal light valve operating in the dynamic scattering mode, and a projection lens images said display surface onto a projection screen, the improvement comprising:
    (a) a fiber optic faceplate adjacent said liquid-crystal display surface, said faceplate having a multiplicity of straight and rigid optical fibers whose longitudinal axes are parallel to each other and perpendicular to the faces of said faceplate whereat they all terminate and to said liquid-crystal display surface so as to provide a direct and undistorted light path to and from said display surface, each of said fibers having an acceptance cone which defines exclusively the angle of incident light transmitted in either direction by said fibers, said acceptance cone being substantially smaller than the one-state scattering cone of said liquid-crystal display surface; and
    (b) means for directing light from said light source onto said faceplate within said acceptance cone, whereby light is transmitted through said faceplate to said liquid crystal display surface where at least a portion of said light is directed back through said faceplace so as to be imaged by said lens onto said projection screen.

2. The system of claim 1 wherein light incident upon said faceplate outside of said acceptance cone is absorbed by said optical fibers.

3. The system of claim 2 wherein each of said fibers comprise a transparent core covered with a transparent sheath having an index of refraction less than the index of refraction of said core, said sheath in turn covered with an optically absorbing material.

4. The system of claim 1 wherein said light from said source impinges upon said faceplate at substantially a right angle.

5. The system of claim 1 wherein said liquid crystal display surface is electronically activated by an array of individually addressable electrodes formed within said light valve.

6. The system of claim 1 wherein said liquid crystal display surface is photoactivated by a photoconductor member formed within said light valve.

7. A direct view image display system comprising:
(a) a reflective liquid crystal device operating in the dynamic scattering mode, said device having a liquid-crystal display surface;
(b) a fiber optic faceplate adjacent said liquid-crystal display surface, said faceplate having a multiplicity of straight and rigid optical fibers whose longitudinal axes are parallel to each other and perpendicular to the faces of said faceplate whereat they all terminate and to said liquid-crystal display surface so as to provide a direct and undistorted light path to and from said display surface, each of said fibers having an acceptance cone which defines exclusively the angle of incident light transmitted in either direction by said fibers, said acceptance cone being substantially smaller than the on-state scattering cone of said liquid crystal display surface whereby stray light from unwanted light sources impinging on said faceplate outside of said acceptance cone is absorbed by said faceplate and light for illuminating said liquid-crystal display surface impinging on said faceplate within said acceptance cone is transmitted to said display surface where at least a portion of said light is directed back through said faceplate to a viewer located within said acceptance cone.

8. The system of claim 7 wherein light incident upon said faceplate outside of said acceptance cone is absorbed by said optical fibers.

9. The system of claim 8 wherein each of said fibers comprise a transparent core covered with a transparent sheath having an index of refraction less than the index of refraction of said core, said sheath in turn covered with an optically absorbing material.

10. The system of claim 7 wherein said liquid crystal display surface is electronically activated by an array of individually addressable electrodes formed within said light valve.

11. The system of claim 7 wherein said liquid crystal display surface is photoactivated by a photoconductor member formed within said light valve.

12. The system of claim 4 wherein said optical fibers have a length of less than approximately 0.6 inches.

13. The system of claim 9 wherein said optical fibers have a length of less than approximately 0.6 inches.

* * * * *

UNITED STATES PATENT AND TRADEMARK OFFICE
CERTIFICATE OF CORRECTION

PATENT NO. : 4,349,817
DATED : September 14, 1982
INVENTOR(S) : Hoffman et al.

It is certified that error appears in the above—identified patent and that said Letters Patent is hereby corrected as shown below:

On the cover page insert:

[73] Assignee: Hughes Aircraft Company
Culver City, California

Signed and Sealed this

Twelfth Day of April 1983

[SEAL]

Attest:

GERALD J. MOSSINGHOFF

Attesting Officer     Commissioner of Patents and Trademarks